United States Patent
Digne et al.

(10) Patent No.: US 9,321,974 B2
(45) Date of Patent: Apr. 26, 2016

(54) PROCESS FOR MILD HYDROCRACKING OF HEAVY HYDROCARBON FRACTIONS WITH OPTIMIZED THERMAL INTEGRATION

(71) Applicant: IFP Energies nouvelles, Rueil-Malmaison Cedex (FR)

(72) Inventors: Romina Digne, Lyons (FR); Heloise Dreux, Lyons (FR); Frederic Feugnet, Lyons (FR); Nicolas Lambert, Issy-les-Moulineaux (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 24 days.

(21) Appl. No.: 14/292,975

(22) Filed: Jun. 2, 2014

(65) Prior Publication Data

US 2014/0353211 A1 Dec. 4, 2014

(30) Foreign Application Priority Data

Jun. 3, 2013 (FR) ...................................... 13 55050

(51) Int. Cl.
*C10G 67/02* (2006.01)
*C10G 47/36* (2006.01)
*C10G 47/00* (2006.01)
*C10G 69/04* (2006.01)

(52) U.S. Cl.
CPC ................. *C10G 67/02* (2013.01); *C10G 47/00* (2013.01); *C10G 47/36* (2013.01); *C10G 69/04* (2013.01); *Y02P 30/10* (2015.11)

(58) Field of Classification Search
CPC ........ C10G 67/02; C10G 47/02; C10G 47/36; C10G 69/04
See application file for complete search history.

(56) References Cited

U.S. PATENT DOCUMENTS 3,402,121 A * 9/1968 Hallman ...................... 208/59

* cited by examiner

*Primary Examiner* — Brian McCaig
(74) *Attorney, Agent, or Firm* — Millen White Zelano and Branigan, PC; John Sopp; Anthony Zelano

(57) ABSTRACT

This invention describes a process for mild hydrocracking of heavy hydrocarbon fractions of the vacuum distillate type or the deasphalted oil type with optimized thermal integration for the purpose of reducing the cost of the exchangers that are used as well as greenhouse gas emissions.

2 Claims, 2 Drawing Sheets

PROCESS FOR MILD HYDROCRACKING OF HEAVY HYDROCARBON FRACTIONS WITH OPTIMIZED THERMAL INTEGRATION

FIELD OF THE INVENTION

The invention relates to the field of the soft hydrocracking of hydrocarbons ("mild hydrocracking," in English). The invention consists in optimizing the thermal integrations between the hot and cold streams of the unit so as to reduce the consumption of hot and cold utilities, and, as a result, the greenhouse gas (GHG) emissions.

This invention can be viewed as an enhancement of the application filed on Dec. 18, 2012 under No. FR 12/03,469.

EXAMINATION OF THE PRIOR ART

The prior art is shown by the diagram of FIG. 1 that will be described in detail in the paragraph "detailed description of the invention."

SUMMARY DESCRIPTION OF THE FIGURES

SUMMARY DESCRIPTION OF THE INVENTION

Figure 1:
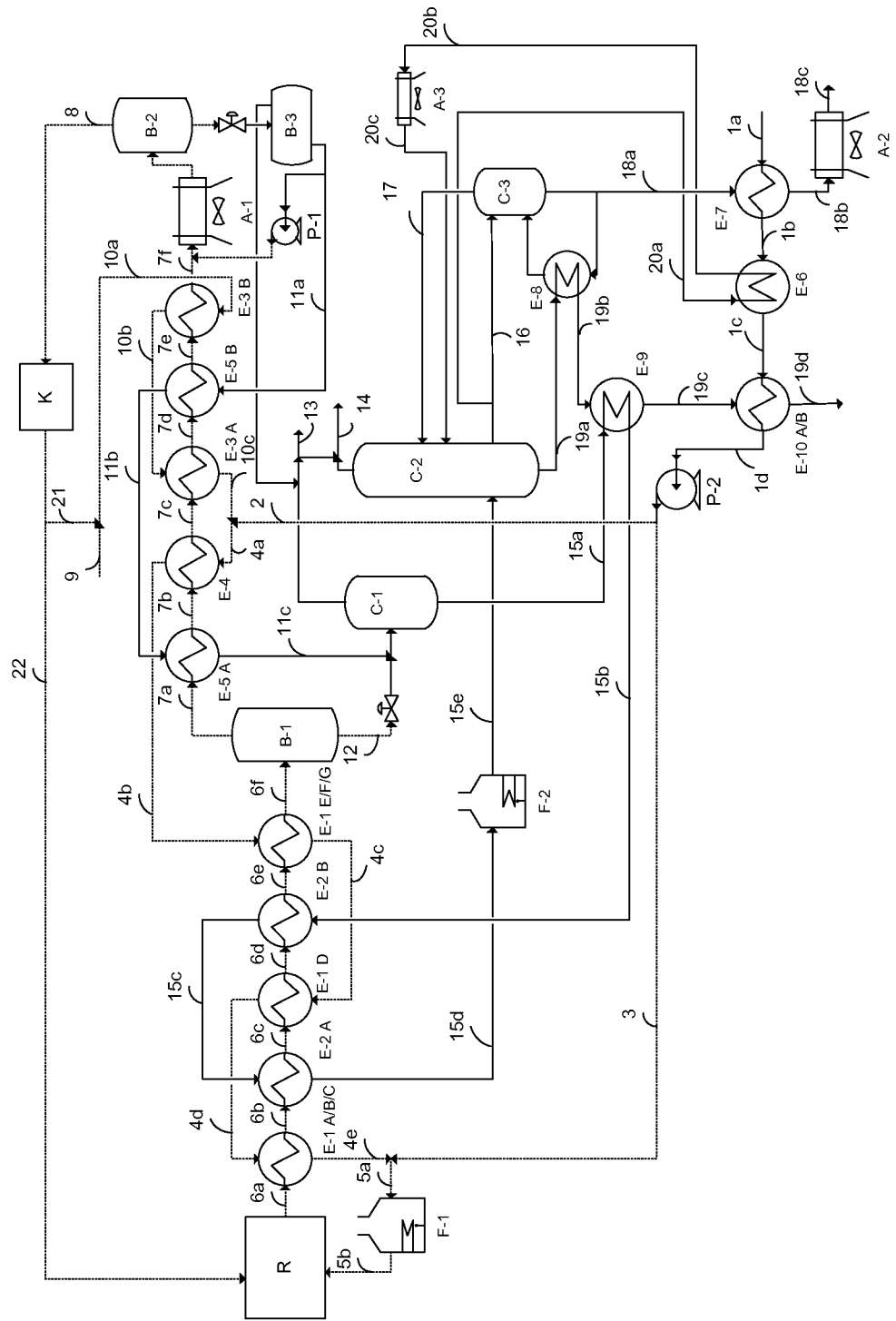
FIG. 1 shows the thermal integrations of a mild hydrocracking process according to the prior art.

This invention describes a process for mild hydrocracking of a fraction of the vacuum distillate (DSV or "VGO" in English) type or the deasphalted oil (DAO) type for the purpose of constituting the feedstock of a catalytic cracking unit, comprising:
  A mild hydrocracking zone R,
  A high-pressure hot separator tank B-1, whose feedstock constitutes the effluent obtained from R,
  A high-pressure cold separator tank B-2, whose feedstock constitutes the gas stream obtained from B-1,
  A low-pressure cold separator tank B-3, whose feedstock is the liquid stream obtained from B-2,
  A zone K for washing with an amine and for compression of the gaseous effluent obtained from B-2, called recycled hydrogen,
  A pump P-2 compressing the VGO feedstock before mixing with the recycled hydrogen obtained from K and the addition of hydrogen,
  A stripper C-1 of the liquid streams obtained from B-1 and B-3, whose bottom product constitutes the feedstock of the fractionator C-2,
  A fractionator C-2, separating the naphtha, the diesel and the residue, and comprising a diesel-circulating reflux,
  A diesel stripper C-3, stripping the diesel obtained from C-2,
  A furnace F-1 heating the feedstock of the mild hydrocracking zone R,
  A furnace F-2 heating the feedstock of the fractionator C-2,
with said process comprising optimized heat exchanges between different streams at different levels of said process for the purpose of ultimately obtaining a reduction in the consumption of energy and the cost of the unit and thus minimizing the environmental impact of the process while increasing its profitability.

Contrary to the prior art, the consumption of energy that is necessary for the compression of the recycling is taken into account in the energy balance of the process. This leads to a new scheme for optimized thermal integration in which the number of exchanges in the compression loop of the recycling is smaller. Actually, the smaller the number of exchanges, the smaller the loss of feedstock (delta P or pressure difference) that is undergone through the exchangers of the loop and consequently the lower the energy consumption for the compression of the recycling. A smaller number of exchanges in the compression loop of the recycling also brings about a significant reduction in the cost of exchangers installed in the loop, given the high pressure in the loop (between 70 and 130 bar).

More specifically, this invention can be defined as a process for mild hydrocracking of a fraction of the DSV or DAO type for the purpose of constituting the feedstock of a catalytic cracking unit, with the process comprising optimized heat exchanges between different streams at different levels of said process, or specifically:
  a) At the exchange train of the heating of the low-pressure feedstock, by exchange:
    In E-7A and E-7B with the stripped diesel obtained from C-3,
    In E-4 with the gaseous effluent obtained from B-1,
    In E-10A and E-10 B/C with the bottom of the fractionator,
    And in the following order: E-7 B, E-4, E-10 A, E-7 A, E-10 B/C,
  b) At the exchange train of the cooling of the gaseous effluent obtained from B-1, by exchange:
    In E-3 with the mixture of the hydrogen addition and a portion of the recycled hydrogen,
    And then in E-4 with the low-pressure feedstock,
  c) At the exchange train of the heating of the liquid obtained from B-3, by exchange:
    In E-6 with the diesel-circulating reflux,
    And then in E-5 with the bottom of the fractionator C-2,
  d) At the exchange train of the cooling of the effluent from the mild hydrocracking zone R, by exchange:
    In E-1 with the high-pressure feedstock of R, with E-1 consisting of several calendars,
    In E-2 with the feedstock of the fractionator C-2, with E-2 being able to consist of several calendars and the calendars being able to be located between calendars of E-1,
  e) At the exchange train of the cooling of the bottom of the fractionator C-2, by exchange:
    First in E-8 with the diesel for reboiling the diesel stripper C-3,
    Then in E-9 with the feedstock of the fractionator C-2,
    Then in E-5 with the liquid obtained from B-3,
    And finally in E-10 with the feedstock of the process, with E-10 being able to consist of several calendars in series.

All of the preceding heat exchanges make it possible to reduce the overall energy consumption for heating the streams of the process and compressing the recycling, from 2 to 10%, and also make it possible to reduce the total number of exchangers of the unit and the number of high-pressure exchangers.

DETAILED DESCRIPTION OF THE INVENTION

To understand the invention, it is first necessary to describe the scheme of thermal integrations according to the mild hydrocracking process of the prior art shown in FIG. 1. To facilitate understanding, the elements that are common to the scheme according to the prior art and to the scheme according to this invention retain the same name and the same symbol in FIG. 1 (according to the prior art) and FIG. 2 (according to the invention). The new elements are introduced with different letters.

The feedstock of the unit (stream 1*a*) can be a vacuum distillate (DSV or VGO, in English "vacuum gas oil") or else a deasphalted oil (DAO). Hereinafter, without being limiting, the example of a VGO feedstock will be used. In a general manner, the feedstock of the process according to the invention will be mentioned. Let us recall in a succinct manner that a vacuum distillate is a fraction that is obtained from a vacuum distillation whose distillation interval is typically located within the range of 180° C. to 450° C. and that a deasphalted oil is an oil that has undergone a deasphalting treatment with a suitable solvent, generally propane or pentane.

The VGO (stream 1*a*) reaches a temperature of approximately 90° C. and low pressure at the inlet of the unit. The VGO is heated to a temperature that is generally between 300° C. and 450° C., and preferably between 350° C. and 400° C. (414° C. in the example, stream 5*b*), corresponding to the inlet temperature in the reaction zone R.

The heating of the VGO is usually done in a first step at low pressure:
  First of all, using stripped diesel (stream 18*a*) by means of the exchanger E-7,
  Then using the diesel-circulating reflux (stream 20*a*) by means of the exchanger E-6,
  And then using the effluent from the bottom of the fractionator C-2 (stream 19*c*) by means of the exchanger E-10 that generally consists of two calendars in series.

Next, the VGO is compressed by a pump P-2 and mixed with a very hydrogen-rich stream (stream 10*c*), and then it is heated, usually at high pressure:
  Using the gaseous effluent (stream 7*b*) by means of the exchanger E-4,
  Using the reaction effluent (stream 6*a*) by means of the exchanger E-1 that consists of several calendars in series (7, in the example, more generally between 4 and 10), with the calendars being called A to G in FIG. 1 for indicating that they are 7 in number. The VGO stream (4*e*) exits therefrom.
  And finally using the furnace F-1 from which the VGO stream (stream 5*b*) exits at the temperature required for the input into the hydrocracking reactor (R).

After compression, a fraction of the VGO is short-circuited for the flexibility of the process (stream 3).

The reaction effluent (stream 6*a*) is cooled by heat exchange to a temperature of approximately 280° C. (more generally between 200 and 300° C.):
  With the reaction feedstock by means of the exchanger E-1,
  With the bottom of the stripper C-1 by means of the exchangers E-2 A and E-2 B generally positioned between the calendars E-1.

The gaseous phase of the reaction effluent at 280° C. (stream 7*a*), rich in hydrogen, is separated from the liquid phase (stream 12) in a high-pressure separator tank B-1.

Next, this gaseous phase (stream 7*a*) is cooled and partially condensed:
  By heat exchange with the hydrocarbon effluent of the low-pressure cold tank B-3 (stream 11*a*) in the exchangers E-5 A and E-5 B,
  By heat exchange with the stream 4*a* in the exchanger E-4, with the stream 4*a* being the mixture of VGO with hydrogen,
  By heat exchange with the stream 10*a* in the exchanger E-3 that consists of two calendars in series (E-3 A and E-3 B), with the stream 10*a* being the mixture of the hydrogen addition (stream 9) with a portion of the recycled hydrogen (stream 21),
  And finally in a cooling tower A-1 to a temperature of approximately 57° C. (57° C. in the example, more generally between 30° C. and 80° C.).

The stream exiting from the cooling tower A-1 is separated into two streams in the high-pressure cold tank B-2:
  A gas stream (stream 8) that is very rich in hydrogen, which is washed with an amine and then compressed in the zone K before being mixed again with the VGO feedstock,
  A liquid stream that is first expanded and then sent to the low-pressure cold tank B-3.

The liquid hydrocarbon stream that is obtained from B-3 (stream 11*a*) is heated by means of the exchangers E-5 B and E-5 A, and then mixed with the liquid phase of the high-pressure hot tank B-1 (stream 12).

The recycled hydrogen that is obtained from K is partially recycled toward the hydrocracking reactor(s) (R) (stream 22) and partially mixed (stream 21) with the hydrogen addition (stream 9) for forming the stream 10*a*. The stream 10*a* is heated by the stream 7*e* and then the stream 7*c* by means of the exchanger E-3 that consists of two calendars in series.

Next, the stream 10*c*, very rich in hydrogen, is mixed with the stream 2 (VGO) for forming the stream 4*a*.

The mixture of streams 11*c* and 12 is stripped with the steam in the stripper C-1. A fraction that is rich in light gases is separated at the top of C-1 (stream 13). The stripped stream (stream 15*a*) is sent to the fractionator C-2 after having been heated:
  By the bottom of the fractionator C-2 (stream 19*b*) by means of the exchanger E-9,
  Then by the reaction effluent by means of the exchanger E-2 that generally consists of two calendars in series,
  And then in a furnace F-2 to a temperature of approximately 370° C. (more generally of between 350 and 400° C.).

The gasoline fractions that are obtained at the top of C-1 and C-2 are mixed for forming the stream 14.

The stream 20*a*, diesel-circulating reflux, is cooled:
  By means of the exchanger E-6, by heat exchange with the VGO feedstock of the unit (stream 1*b*),
  And then by means of a cooling tower A-3.

The diesel that is drawn off from the fractionator C-2 (stream 16) is stripped in a so-called diesel stripper column C-3, reboiled by heat exchange with the bottom of the fractionator C-2 (stream 19*a*) by means of the exchanger E-8.

The stripped diesel (stream 18*a*) is cooled by the low-pressure feedstock (stream 1*a*) by means of the exchanger E-7, and then it is cooled by the cooling tower A-2 to a temperature of approximately 65° C. (more generally between 50° C. and 70° C.).

The bottom of the fractionator C-2, also called residue, is cooled:
  By heat exchange in E-8 with the diesel stream,
  By heat exchange in E-9 with the product at the bottom of the stripper C-1 (stream 15*a*),
  And finally by heat exchange with the feedstock (stream 1*c*) in the exchanger E-10 that generally consists of two calendars in series.

Figure 2:
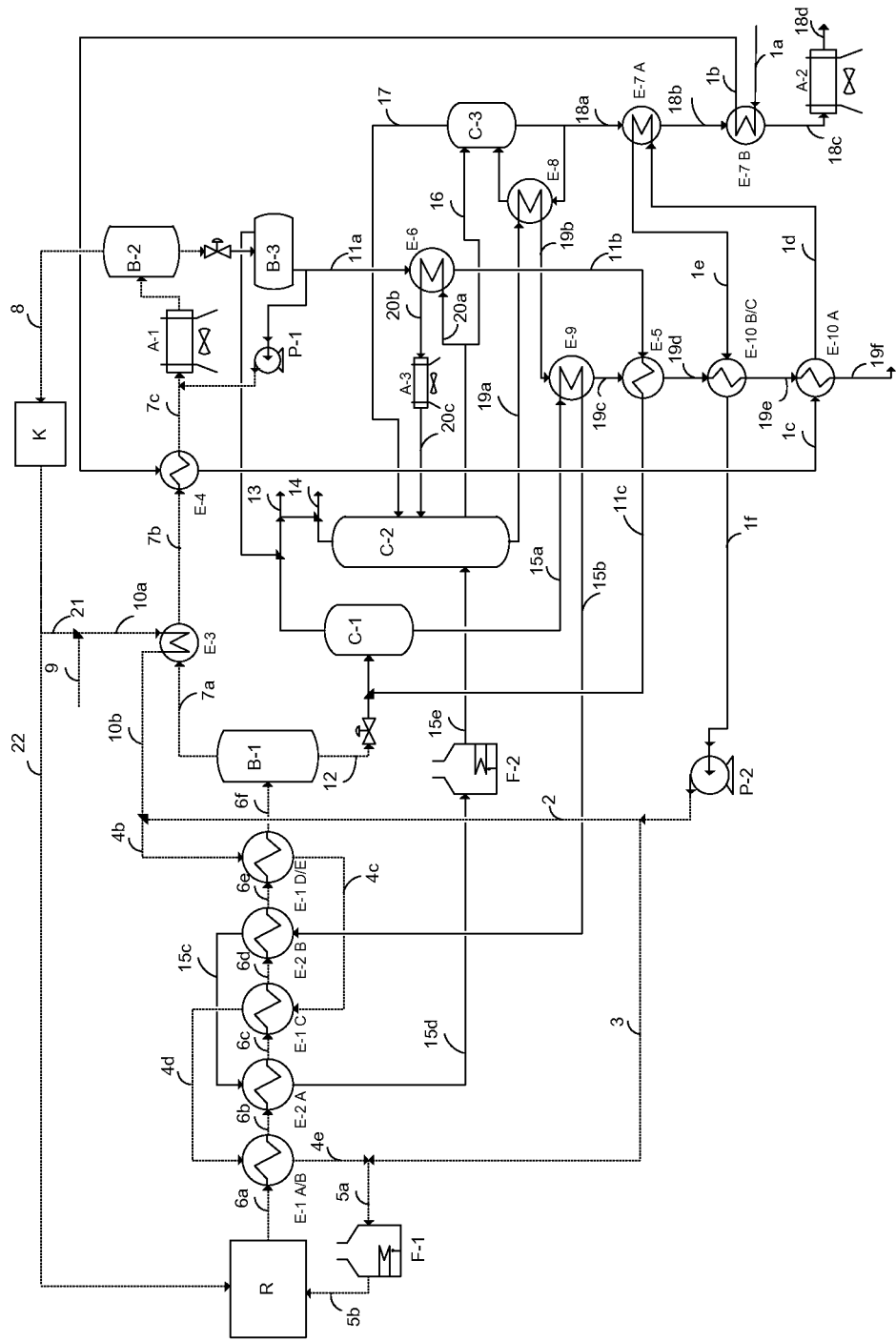
FIG. 2 shows the new thermal integrations of the mild hydrocracking process according to the invention.

FIG. 2 according to this invention can be described in the following manner:

In the process according to the invention, the heating of the VGO (stream 1*a*) is done:
  Using the stripped diesel (streams 18*a* and 18*b*) by means of the exchangers E-7 A and E-7 B,
  Using the gaseous effluent obtained from B-1 (stream 7*b*) by means of the new exchanger E-4, Using the effluent from the bottom of the fractionator C-2 (streams 19d and 19e) by means of the exchangers E-10 A and E-10 B/C, And in the following order: E-7 B, E-4, E-10 A, E-7 A, E-10 B/C.

These changes relative to the prior art make it possible to bring the low-pressure feedstock upstream from the pump P-2 (stream 1f) at a higher temperature (252° C. according to the invention instead of 232° C. in the prior art).

The stream if is compressed by means of P-2 and then separated into two streams (stream 2 and stream 3) in a manner that is identical to the prior art.

The stream 2 is next mixed with hydrogen (stream 10b), hydrogen that will have been heated by means of the exchanger E-3 in a single calendar instead of the two calendars in the prior art. The resulting mixture (stream 4b) is heated directly by the effluent of the reactor R (stream 6a) by means of E-1, contrary to the prior art where the mixture (stream 4a) was first heated by the gaseous effluent obtained from B-1 by means of a calendar before being heated by the effluent of the reactor R in E-1. In addition, in the process according to the invention, E-1 consists of a smaller number of calendars relative to the prior art (5 calendars instead of 7 in the example).

In the process according to the invention, the stream 11a that is obtained from B-3 is first heated in E-6 using the diesel-circulating reflux (stream 20a) and then in E-5 using the residue obtained from the fractionator C-2 (stream 19c). In the prior art, the stream 11a was heated by the gaseous effluent that is obtained from B-1 in two calendars. These new heat exchanges (E-5 and E-6) make it possible to reduce the loss of feedstock in the loop for compression of hydrogen and the number of high-pressure exchangers.

In the process according to the invention, the stream 15a (bottom of the stripper C-1) is first heated with the bottom of the fractionator C-2 in the exchanger E-9, and then with the reaction effluent by means of two calendars E-2 A and E-2 B. This makes it possible to have a stream at the inlet of the furnace F-2 (stream 15d) at a temperature that is identical to that of the prior art. The thermal power of the furnace F-2 is therefore identical in the process according to the invention and in the prior art.

All of these modifications relative to the prior art make it possible to reduce the requirements for hot utilities of the process and the cost of equipment of the process. Actually, the small number of exchanges in the compression loop makes it possible to reduce the energy consumption of the recycling compressor and the cost of high-pressure exchangers.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application No. 13/55.050, filed Jun. 3, 2013, are incorporated by reference herein.

EXAMPLE ACCORDING TO THE INVENTION

A mild hydrocracking unit consists of 3 reactors (7 catalytic beds).

Capacity: 442 t/h

Temperature of the reactors: 420° C. (mean temperature of each bed)

Pressure of the reactors: 101 to 129 bars effective LHSV=0.313 h$^{-1}$

Table 1 indicates the primary temperatures of the mild hydrocracking unit according to the prior art and according to the invention.

TABLE 1

Temperature of the Streams

|  | According to the Prior Art | According to the Invention |
|---|---|---|
| 1a |  | 90 |
| 2 and 3 | 232 | 252 |
| 4a | 225 | — |
| 4b | 243 | 238 |
| 5a | 391 | 386 |
| 5b | 414 |  |
| 6a | 422 |  |
| 6f, 7a, and 12 | 280 |  |
| 7c | 246 | 181 |
| 7f | 184 | — |
| 8 | 57 |  |
| 10a | 124 |  |
| 10b | 181 | 226 |
| 10c | 223 | — |
| 11c | 266 |  |
| 15d | 355 |  |
| 15e | 370 |  |
| 18a | 270 |  |
| 18b | 136 | 208 |
| 18c | 65 | 132 |
| 18d | — | 65 |
| 19a | 336 |  |
| 19d | 206 | 294 |
| 19f | — | 210 |
| 20a | 236 |  |
| 20b | 188 | 207 |
| 20c | 175 |  |

Table 2 indicates the number of heat exchanges of each stream of the compression loop of the mild hydrocracking unit according to the prior art and according to the invention.

TABLE 2

Number of Heat Exchanges in the Compression Loop

| | Number of Heat Exchanges | |
|---|---|---|
| | Process According to the Prior Art | Process According to the Invention |
| Hydrogen (Stream 10a) | 2 | 1 |
| High-Pressure Hydrogen/VGO Mixture (Stream 4a) | 8 | 5 |
| Reaction Effluent (Stream 6a) | 9 | 7 |
| Gaseous Effluent of B-1 (Stream 7a) | 5 | 2 |
| Total | 24 | 15 |

The number of heat exchanges in the compression loop runs from 24 to 15. This makes it possible to reduce the energy consumption of the recycling compressor (Table 3).

Table 3 indicates the powers of the exchanges with utilities of the mild hydrocracking unit according to the prior art and according to the invention.

TABLE 3

Energy Balance

| Thermal Power (MWeq) | Process According to the Prior Art | Process According to the Invention | Deviation |
|---|---|---|---|
| Furnace F-1 | 12.2 | 15.1 | +2.9 |
| Furnace F-2 | 6.9 | 6.9 | — |
| Compression of the Recycling[1] | 65.1 | 58.6 | −6.5 |
| Furnaces F-1 + F-2 + Compression | 84.2 | 80.6 | −3.6 |

[1]The compression power of the recycling compressor is converted into MWeq by using the following factor: 1 MW of compression power = 4.37 MWeq of HP steam The process according to the invention makes it possible to reduce the consumption of the recycling compressor by 6.5 MWeq.

The overall thermal power of the furnaces (F-1+F-2) is slightly higher in the process according to the invention, but overall a reduction of the hot utilities by 3.6 MW is observed, or a reduction of 4.3%.

Another advantage of the invention is the increase in the temperature of the residue at the outlet of the process so as to be sent directly into the FCC riser without preheating or cooling in advance. In the prior art, this stream should be heated by 4° C. (or 0.9 MW) before going to the riser.

The process according to the invention also makes it possible to reduce the cost of the exchangers using the reduction of the number of high-pressure calendars and the total number of calendars.

Table 4 indicates the number and the cost of the exchangers of the mild hydrocracking unit according to the prior art and according to the invention. Only the exchangers having heat exchanges between streams of the process are considered.

TABLE 4

Exchangers Having Heat Exchanges Between Streams of the Process

| | According to the Prior Art | According to the Invention | Deviation |
|---|---|---|---|
| Total Number of Exchangers | 20 | 17 | −3 |
| Number of High-Pressure Exchangers | 14 | 9 | −5 |
| Cost of Installed Exchangers (M$) | 44.2 | 36.9 | −7.3 |

The process according to the invention makes it possible to reduce the cost of exchangers by 7.3 M$, or a reduction of 16% of the cost of the exchangers having heat exchanges between streams of the process.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for mild hydrocracking of a vacuum distillate (DSV or VGO) or deasphalted oil (DAO) fraction to provide a feedstock of a catalytic cracking unit, comprising:

in a furnace F-1 heating the fraction for the hydrocracking, hydrocracking the fraction in a mild hydrocracking zone R, separating the effluent obtained from R in a high-pressure hot separator tank B-1 to obtain a gas stream and a liquid stream, separating the gas stream obtained from B-1 in a high-pressure cold separator tank B-2 to obtain a gas stream and a liquid stream, separating the liquid stream obtained from B-2 in a low-pressure cold separator tank B-3 to obtain a gas stream and a liquid stream, in a zone K, washing with an amine and compressing the gas stream obtained from B-2, to obtain recycled hydrogen, and adding further hydrogen to the recycled hydrogen, with a pump P-2, compressing the fraction fed into the hydrocracking zone R and then mixing it with the recycled hydrogen obtained from zone K, stripping, in a stripper C-1, the liquid streams obtained from separator tanks B-1 and B-3, to provide a bottom product as a feedstock of a fractionator C-2, in a furnace F-2 heating the feedstock of the fractionator C-2, in a fractionator C-2, separating the bottom product of stripper C-1 to obtain naphtha, diesel and bottom residue fractions, and using a diesel-circulating reflux to the fractionator C-2, in a diesel stripper C-3, stripping the diesel fraction obtained from C-2, with said process comprising the following heat exchanges:

a) heating of the fraction fed into the hydrocracking zone R before compressing it, by exchange:
in exchangers E-7 A and E-7 B, with the stripped diesel fraction obtained from C-3,
in an exchanger E-4, with the gas stream obtained from B-1,
in exchangers E-10 A and E-10 B/C, with the bottom residue fraction of the fractionator C-2,
in the following order: E-7 B, E-4, E-10 A, E-7 A, E-10 B/C, b) cooling of the gas stream obtained from B-1, by exchange:
in an exchanger E-3, with a portion of the recycled hydrogen from K with added further hydrogen,
and then, in an exchanger E-4, with the fraction fed into the hydrocracking zone R before compressing it, c) heating of the liquid stream obtained from B-3, by exchange:
in an exchanger E-6, with the diesel-circulating reflux,
and then, in an exchanger E-5, with the bottom residue fraction of the fractionator C-2, d) cooling of the effluent from the mild hydrocracking zone R, by exchange:
in an exchanger train E-1, with the fraction fed into the hydrocracking zone R after compressing it,
in an exchanger train E-2, with the feedstock of the fractionator C-2, e) cooling of the bottom residue fraction of the fractionator C-2, by exchange:
first, in an exchanger E-8, with reboil from the diesel-circulating reflux of the stripper C-3,
then, in an exchanger E-9, with the feedstock of the fractionator C-2,
then, in an exchanger E-5, with the liquid stream obtained from B-3,
and, in an exchanger train E-10, with the fraction fed into the hydrocracking zone R before compressing it.

2. The process of claim 1, wherein:
the exchanger E-1 consists of more than one calendars, the exchanger E-2 consists of more than one calendars and the calendars of the exchangers E-1 and E-2 form an exchanger train of the calendars in series with the calendars for E-2 optionally being located between the calendars for E-1, and the exchanger E-10, consists of more than one calendars to form an exchanger train of the calendars in series.

\* \* \* \* \*